United States Patent
Peter et al.

[11] Patent Number: 6,026,634
[45] Date of Patent: Feb. 22, 2000

[54] CONTROL SYSTEM AND METHOD FOR STOPPING THE ROTATION OF A CUTTING BLADE WHEN THE MOWER IS PLACED IN REVERSE

[75] Inventors: Timothy Jon Peter, Medina; James Patrick Cykon, Warren; Gerald Hobrath, Brunswick, all of Ohio

[73] Assignee: MTD Products Inc, Cleveland, Ohio

[21] Appl. No.: 08/786,548

[22] Filed: Jan. 21, 1997

[51] Int. Cl.[7] .................................................. A01D 69/02
[52] U.S. Cl. .......................... 56/10.8; 56/11.3; 56/14.7; 180/6.5
[58] Field of Search .................................. 56/11.2, 10.8, 56/11.3, 13.5, 16.7, 11.8, 14.7; 180/6.48, 6.5, 333

[56] References Cited

U.S. PATENT DOCUMENTS

| | | | |
|---|---|---|---|
| 2,951,393 | 9/1960 | Schroeder et al. | 74/473 |
| 3,792,744 | 2/1974 | Gray | 180/6.48 |
| 3,984,967 | 10/1976 | Jones | 56/11.8 |
| 3,999,643 | 12/1976 | Jones | 192/52 |
| 4,016,709 | 4/1977 | Hauser et al. | 56/10.2 |
| 4,116,313 | 9/1978 | Maucher | 192/3.63 |
| 4,231,217 | 11/1980 | Lucas | 56/17.4 |
| 4,306,405 | 12/1981 | Fleigle | 56/11.3 |
| 4,346,618 | 8/1982 | Sakamoto et al. | 74/491 |
| 4,395,865 | 8/1983 | Davis, Jr. et al. | 56/13.3 |
| 4,615,232 | 10/1986 | Puppala | 74/473 |
| 5,247,784 | 9/1993 | Kitamura et al. | 56/10.8 |
| 5,279,101 | 1/1994 | Sueshige | 56/11.5 |
| 5,355,661 | 10/1994 | Tomiyama | 56/10.8 |
| 5,507,138 | 4/1996 | Wright et al. | 56/14.7 |
| 5,511,367 | 4/1996 | Powers et al. | 56/11.2 |

*Primary Examiner*—H. Shackelford
*Attorney, Agent, or Firm*—Emerson & Associates; Roger D. Emerson; Timothy D. Bennett

[57] ABSTRACT

A control system is used with an associated mower having a cutting blade, a drive shaft for rotating the cutting blade, first and second drive wheels, and a power train for driving the first and second drive wheels. The control system has an electric clutch for selectively coupling the cutting blade to the drive shaft, first and second handles for independently driving the first and second drive wheels, first and second switches selectively switchable between first and second positions, a relay for electrically connecting the first and second switches to the electric clutch and control rods for mechanically connecting the first and second handles to the first and second switches. First and second handles are placeable into reverse positions. This causing first and second bell cranks to rotate about a control shaft which lifts first and second control rods. When the control rods are lifted, first and second switches are switched and power is disconnected to the electric clutch. The cutting blade is thereby detached from the drive shaft.

13 Claims, 10 Drawing Sheets

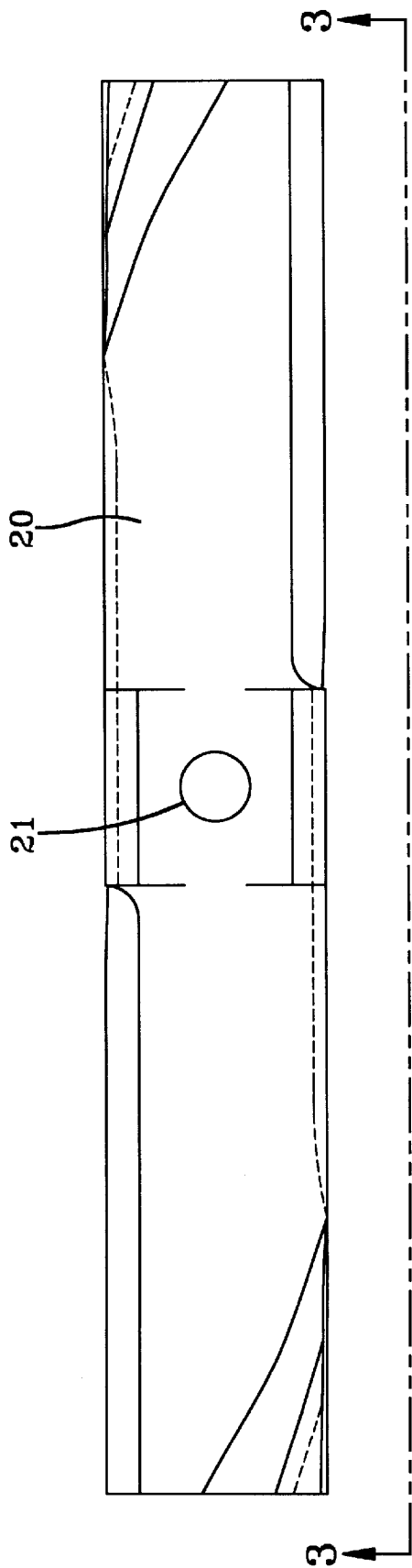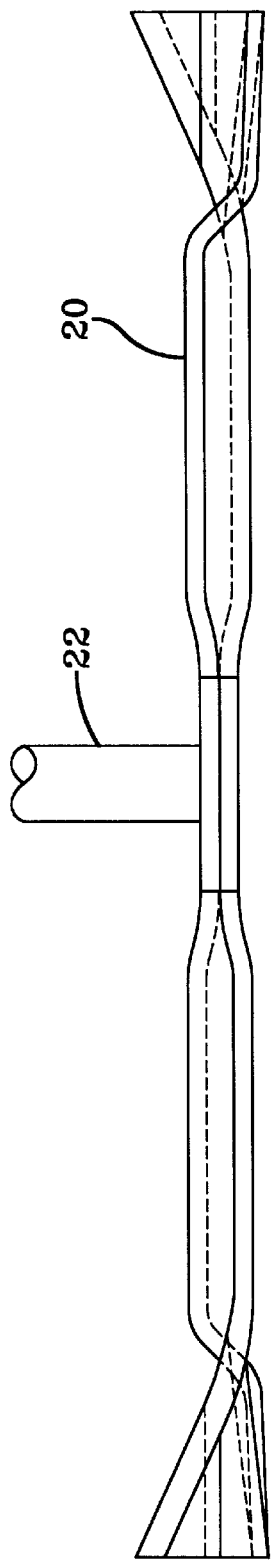

CONTROL SYSTEM AND METHOD FOR STOPPING THE ROTATION OF A CUTTING BLADE WHEN THE MOWER IS PLACED IN REVERSE

BACKGROUND OF THE INVENTION

1. Field of Invention

This invention pertains to the art of methods and apparatuses for use in lawn and garden care, and more specifically to methods and apparatuses for stopping the rotation of a cutting blade when the mower is placed in reverse.

2. Description of the Related Art

It is known to provide lawn mowers, with means for preventing the cutting blade from cutting when the mower is traveling in reverse. Such means are provided for safety purposes. In U.S. Pat. No. 3,984,967, for example, Jones discloses a mechanical interlock mechanism between a manually operated clutch and a manually operated transmission control so as to prevent operation of a mower during reverse travel of a tractor. In U.S. Pat. No. 3,999,643, Jones discloses a transmission lever that when moved to a reverse position, moves a switch to an open position to deenergize an electric clutch through which an engine drives a mower blade.

Recent advances in mower design have made the previously mentioned inventions inadequate. One such recent advance is mowers having zero radius turning capabilities. Typically such mowers have two drive wheels, one on each side of the mower, and two driving control means, each of which controls one of the drive wheels. To make a zero radius turn it is necessary to drive one of the drive wheels in a forward direction while simultaneously driving the other drive wheel in a reverse direction. It is desirable to use the mower cutting blade while such a zero radius turn is being made, thus any device which causes the cutting blade to stop cutting when one of the drive wheels is in reverse, such as those mentioned above, is unsuitable.

The present invention provides methods and apparatuses for preventing cutting blades from cutting when a mower is in full reverse without preventing cutting during activities, such as zero radius turning, that require only one drive wheel to be in reverse. The difficulties inherent in the art are therefore overcome in a way which is simple and efficient, while providing better and more advantageous results.

SUMMARY OF THE INVENTION

In accordance with one aspect of the invention there is provided a control system for use with an associated mower. The mower has a cutting blade, rotating means for rotating the cutting blade, first and second drive wheels, and driving means for driving the first and second drive wheels. The control system has coupling means for selectively uncoupling the cutting blade to the rotating means, first and second driving control means for independently driving the first and second drive wheels, first and second switches selectively switchable between first and second positions, electrical connecting means for electrically connecting said first and second switches to said coupling means, and mechanical connecting means for mechanically connecting said first and second driving control means to said first and second switches.

In accordance with another aspect of the invention there is provided lawn mower which has a cutting blade, rotating means for rotating the cutting blade, first and second drive wheels, driving means for driving the first and second drive wheels, first and second driving control means for independently driving said first and second drive wheels, an electric clutch, first and second switches, electrical connecting means for electrically connecting said first and second switches to said electric clutch, and mechanical connecting means for mechanically connecting said first and second driving control means to said first and second switches.

In accordance with another aspect of the invention there is provided a method for preventing a mower from cutting when the mower is placed in reverse. First and second driving control means are placed into reverse positions. This causes first and second bell cranks to rotate about a control shaft which lifts first and second control rods. When the control rods are lifted, first and second switches are switched and power is disconnected to an electric clutch. Finally, the cutting blade is detached from the rotating means used to rotate the cutting blade.

One advantage of the invention is that the control system for driving the drive wheels is easy to operate.

Another advantage of the present invention is that cutting blades are automatically prevented from cutting when a mower is in full reverse, providing an important safety control system.

Another advantage of the present invention is that cutting can continue when only one drive wheel is in reverse. This enables recent advances such as zero radius turning capabilities to be used without preventing cutting.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 2 is a top view of a cutting blade.

FIG. 3 is a side view of the cutting blade taken along the line 3—3 of FIG. 2.

DESCRIPTION OF THE PREFERRED EMBODIMENT

Figure 1:
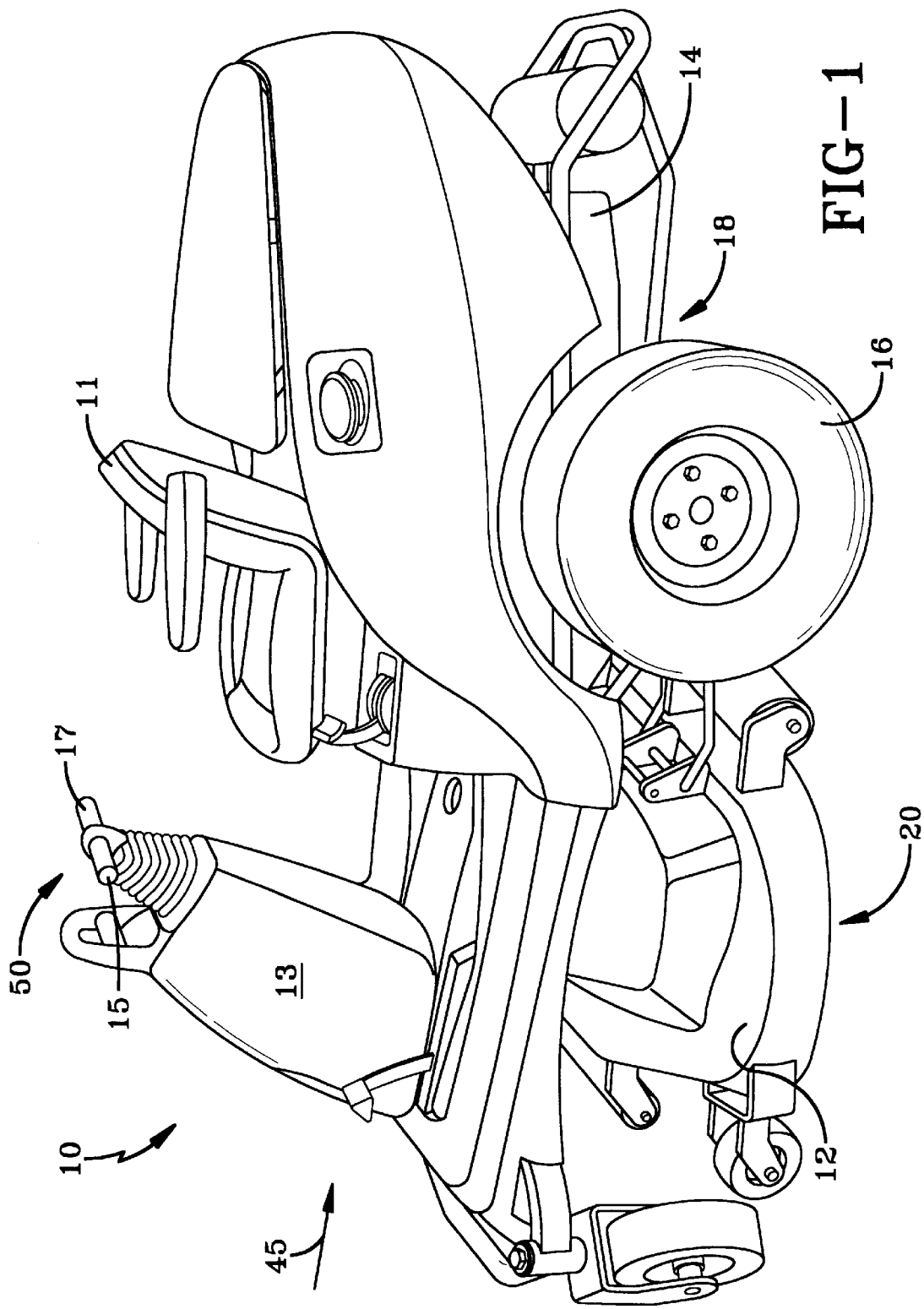
FIG. 1 shows a riding lawn mower such as uses the control system of this invention.

Referring now to the drawings wherein the showings are for purposes of illustrating a preferred embodiment of the invention only and not for purposes of limiting the same, FIG. 1 shows a riding lawn mower 10 which is equipped with the present invention, a control system 50 which prevents a mower from cutting when the mower is placed in full reverse. This preferred embodiment is directed to a riding lawn mower but the invention is applicable to walk-behind mowers, off-the-road vehicles, and other applications as well. The riding lawn mower 10 has an operator seat 11, a cutting deck 12, a console cover 13 and an engine 14. The riding lawn mower 10 also has first and second driving control means which in this embodiment comprises a first control handle 15 which is used to independently control the direction and speed of first drive wheel 16 and a second control handle 17 which is used to independently control the direction and speed of second drive wheel 18. First control handle 15 is selectively placeable into reverse position whereby first drive wheel 16 is driven in a reverse direction. Second control handle 17 is likewise selectively placeable into reverse position whereby second drive wheel 18 is driven in a reverse direction. Full reverse occurs only when both first and second control handles 15, 17 are placed into reverse positions.

With reference to FIGS. 1–3, the cutting deck 12 has cutting blades 20 within it for cutting lawns or other vegetation (not shown). In this preferred embodiment the cutting deck 12 has three blades 20 which are mulching blades but other types, styles and numbers of blades, chosen with sound engineering judgement, could also be used. Opening 21 is for receiving a shaft 22 which is used to rotate the cutting blade 20 whereby cutting can occur.

With reference to FIGS. 1–4 the engine 14 which can be of any type currently used in the art is used to provide rotation means for the cutting blade 20 and to provide driving means for first and second drive wheels 16, 18. The cutting blade 20 can be selectively detached from the engine 14 as will now be discussed. The engine 14 drives a shaft 19 which is fixedly attached to an electric clutch 24 which is selectively connected to a pulley 25. The pulley 25 is operatively connected to the blades 20 through belt 26, blade spindles (not shown but as currently known in the art) and the previously mentioned shafts 22. The electric clutch 24 which is used to couple the cutting blades 20 from the engine 14 and can be of any type currently known in the art, has an armature 29 and a rotor 27 which is selectively energized by coil 28. When rotor 27 is energized by coil 28, rotor 27 is magnetically attracted to armature 29 bringing the electric clutch 24 into coupling engagement with pulley 25. Thus, when the engine 14 drives shaft 19 which rotates electric clutch 24, the pulley 25 is also rotated and via, the connecting means mentioned above, so is the cutting blade 20. When rotor 27 is de-energized by coil 28, rotor 27 is not attracted to armature 29 so the electric clutch 24 is uncoupled from the pulley 25. In this state, when the engine 14 drives shaft 19 which rotates electric clutch 24, the pulley 25 is not rotated and thus neither is the cutting blade 20. In this way the cutting blade 20 can be selectively detached from engine 14.

With reference now to FIGS. 6–7, 15–17, the control system 50 includes first and second switches 71, 72 which are selectively switchable between first and second positions. First and second switches 71, 72 can be of any type chosen with sound engineering judgement but in this preferred embodiment are plunger switches which are normally open/normally closed (N.O./N.C.). First and second switches 71, 72 have plungers 69, 70 and switch bodies 73, 74, respectively. When first and second switches 71, 72 are in a first position (which is open in this embodiment) shown in FIGS. 15–16, the plungers 69, 70 extend from the switch bodies 73, 74 a distance X1. When first and second switches 71, 72 are switched into a second position (which is closed in this embodiment) shown in FIG. 17, the plungers 69, 70 extend from the switch bodies 73, 74 a distance X2 where X2 is significantly larger than distance X1. The operation of first and second switches 71, 72 will be discussed further below.

With reference now to FIGS. 1, 5–7, the control system 50 has mechanical connecting means for mechanically connecting first and second control handles 15, 17 to first and second switches 71, 72. Much of the control system 50 is located inside the console cover 13 and includes support tower 52 as well as first and second upper bell cranks 53, 54 which are operatively connected to first and second control handles 15, 17 respectively and are rotatable about first control shaft 56 which is operatively connected to support tower 52. First and second upper bell cranks 53, 54 are pivotably connected to first and second upper control rods 57, 58 which are pivotably connected to first and second lower bell cranks 59, 60. First and second upper control rods 57, 58 are movable along their axis. First and second lower bell cranks 59, 60 are rotatable about second control shaft 62 which is operatively connected to support tower 52. Pivotably connected to first and second lower bell cranks 59, 60 are first and second lower control rods 63, 64 respectively which have ends 65, 66 which are operatively connected to hydrostatic power units (not shown) for use in driving first and second drive wheels 16, 18 as is commonly known in the art. The hydrostatic power units can be of any type chosen with sound engineering judgement.

With reference now to FIGS. 5–12, 15–17, first and second switching mechanisms 67, 68 have first and second rod brackets 75, 76. First pin 83 is selectively movable along its axis within upper opening 79 and lower opening 81 of first rod bracket 75 which is fixedly attached by weld 77 to first upper control rod 57. Second pin 84 is similarly selectively movable along its axis within openings (not shown) of second rod bracket 76 which is fixedly attached to second upper control rod 58. First and second springs 85, 86 are positioned around first and second pins 83, 84 and they bias first and second pins 83, 84 toward first and second switches 71, 72. Securing means, in this embodiment first and second cotter pins 87, 88, secure first and second pins 83, 84 to first and second rod brackets 75, 76. Switching bracket 89 has an end 43 which is fixedly attached to the support tower 52 and has first and second openings 31, 32 for holding first and second switches 71, 72 in operating contact with first and second pins 83, 84.

Figure 7:
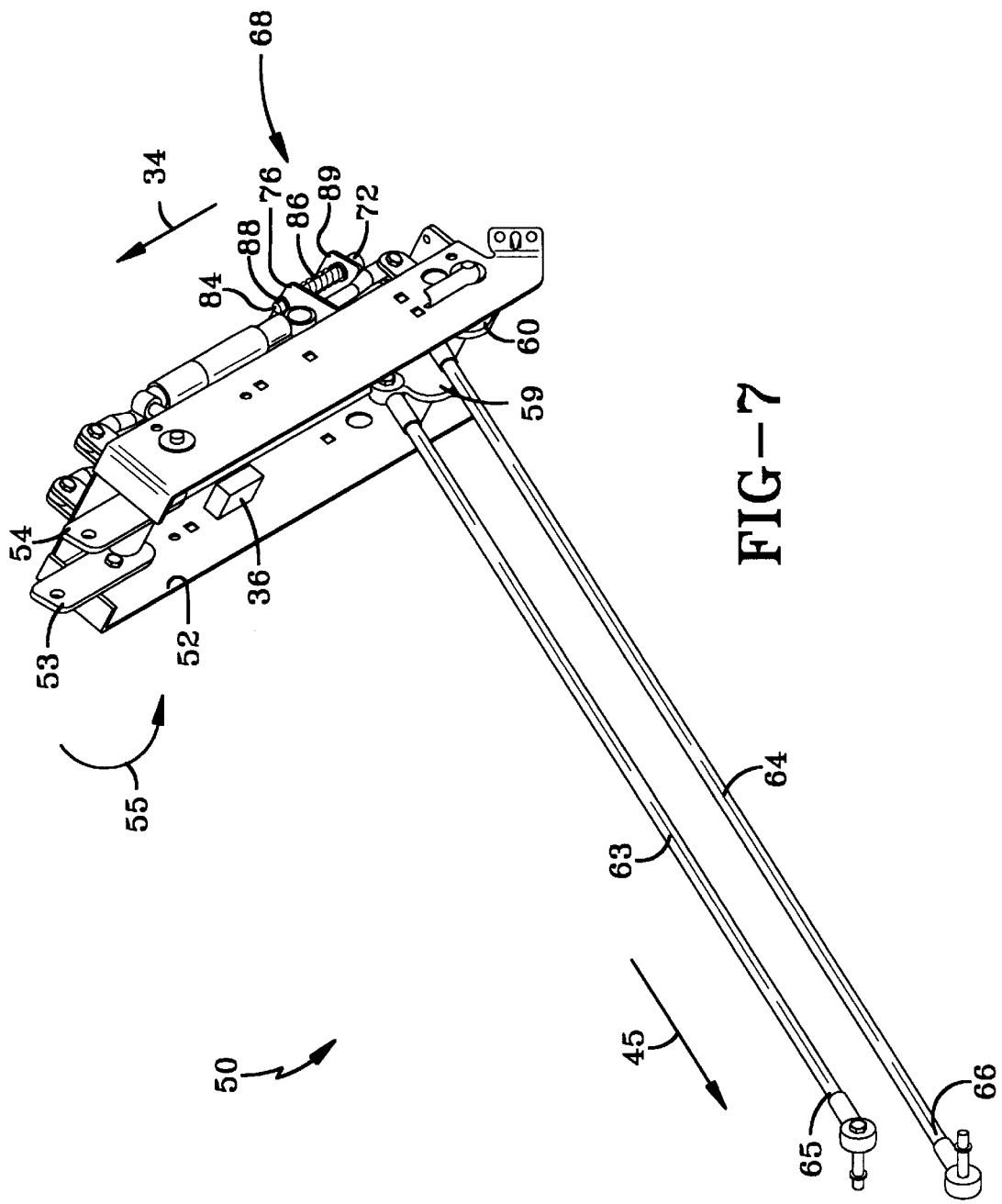
FIG. 7 is a perspective back view of the control system showing the lower control rods and the relay.
Figure 8:
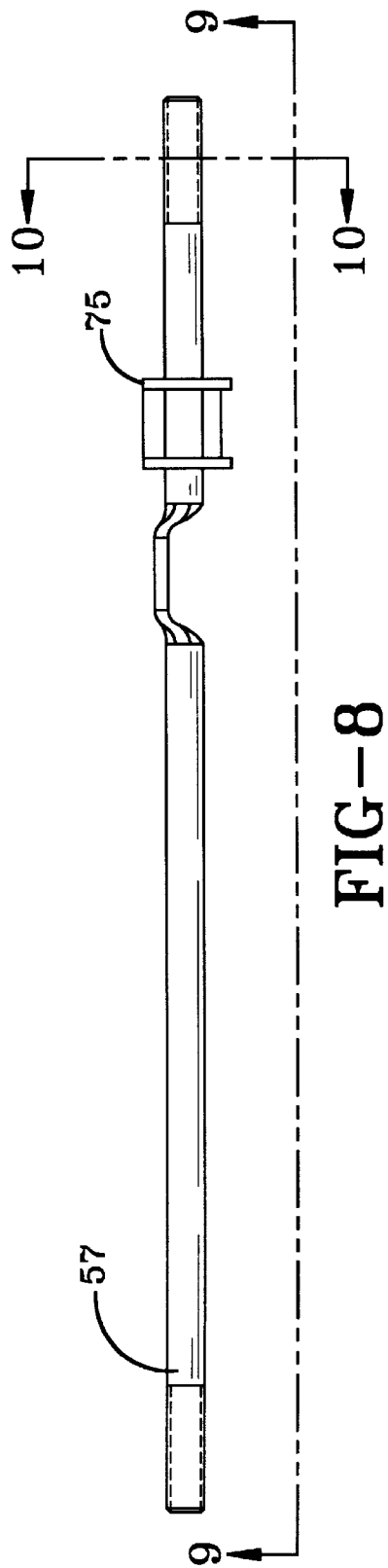
FIG. 8 is a top view of the first upper control rod showing the first rod bracket.
Figure 9:
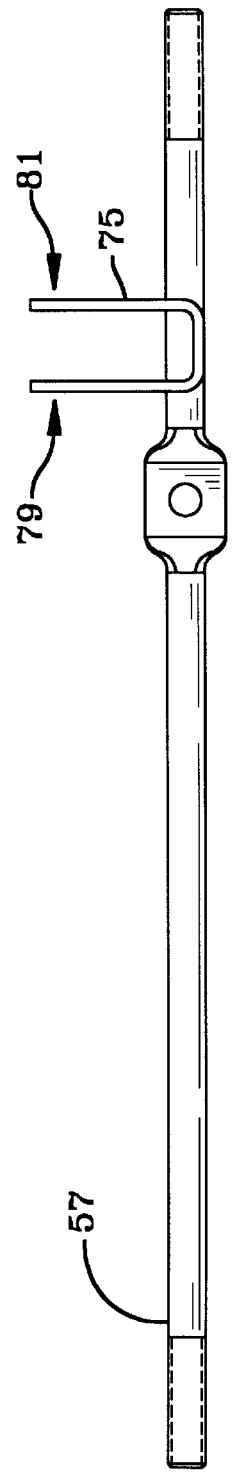
FIG. 9 is a side view of the first upper control rod taken along the line 9—9 of FIG. 8 showing the openings in the first rod bracket.
Figure 10:
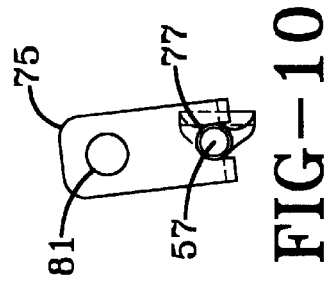
FIG. 10 is an end view of the first upper control rod taken along the line 10—10 of FIG. 8 showing the weld used to hold the first rod bracket to the first upper control rod.
Figure 11:
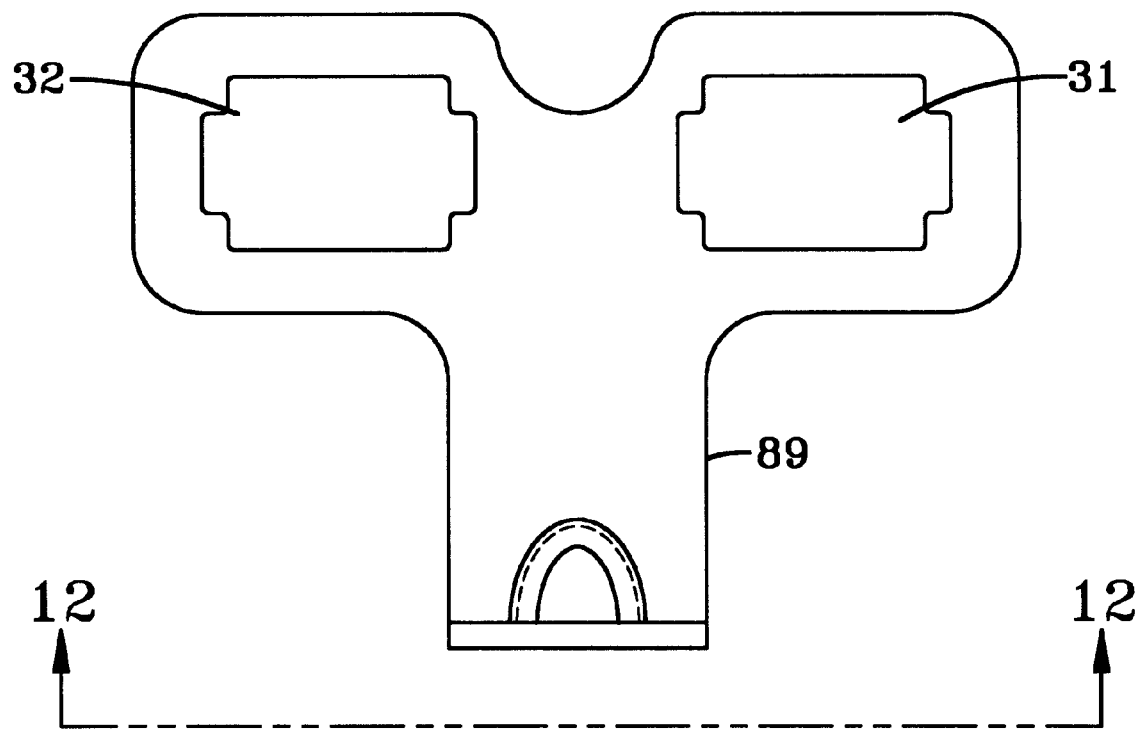
FIG. 11 is a top view of the switching bracket showing the openings used to hold first and second switches into operative contact with first and second pins.
Figure 12:
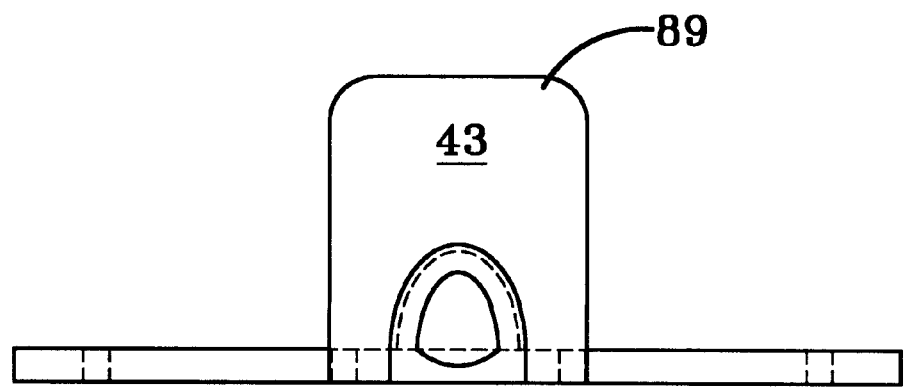
FIG. 12 is a side view of the switching bracket taken along the line 12—12 of FIG. 11 showing the end which is connected to the support tower.
Figure 13:
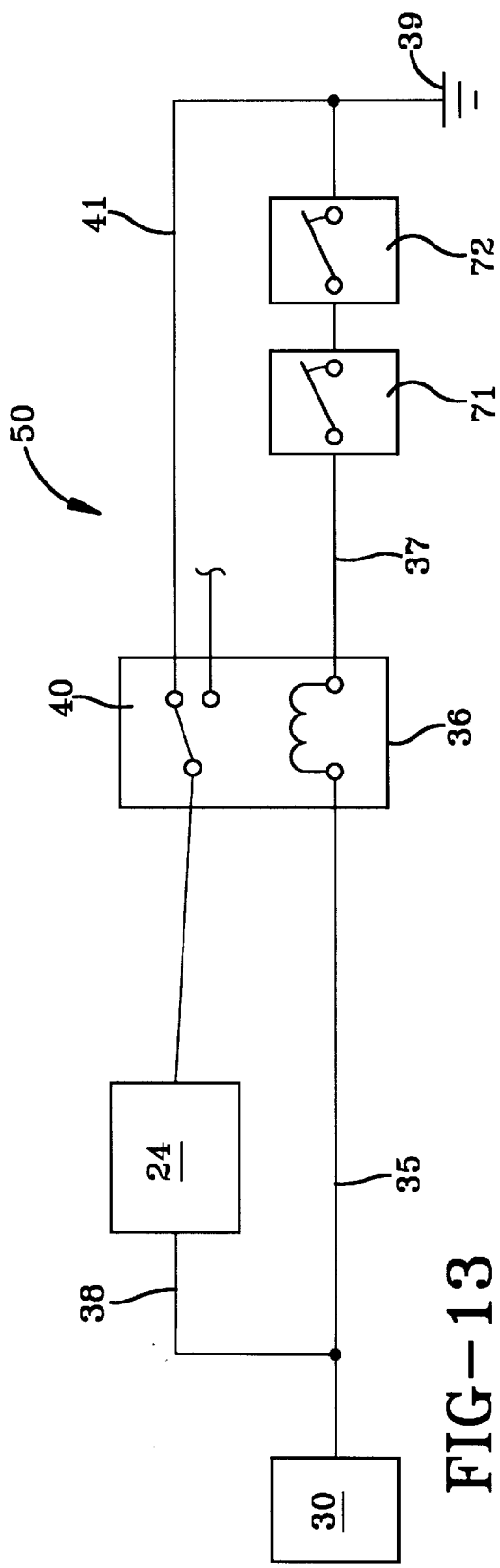
FIG. 13 is a simplified electrical schematic showing the control system when the riding lawn mower is not in reverse.
Figure 14:
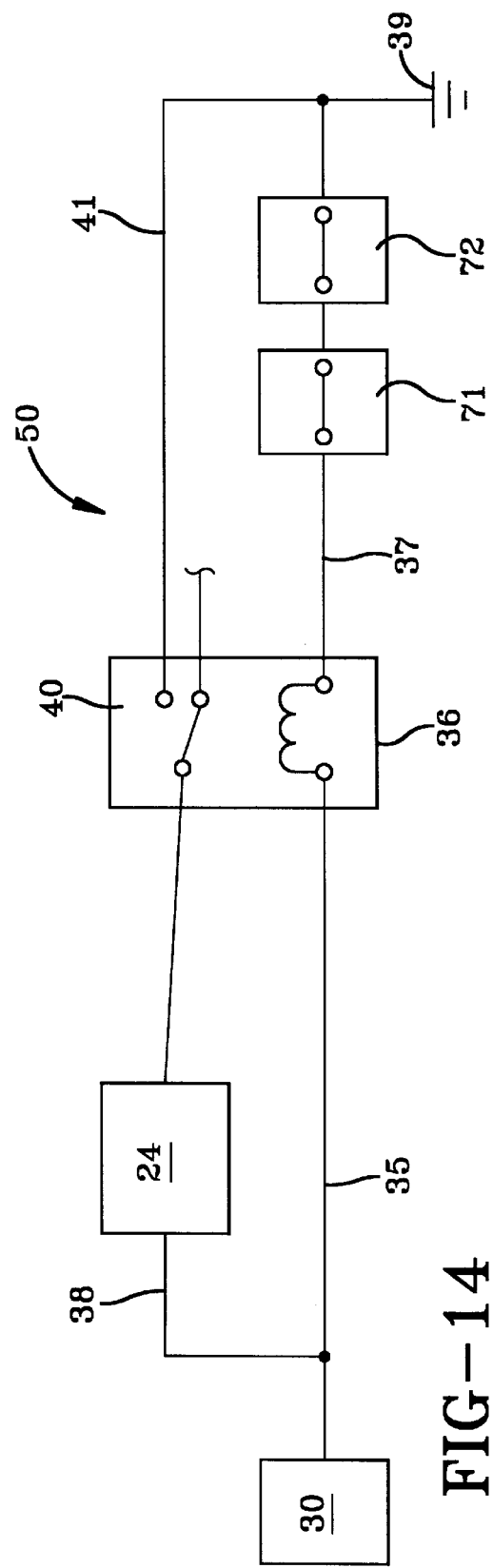
FIG. 14 is a simplified electrical schematic showing the control system when the riding lawn mower is in full reverse.

With reference to FIGS. 13–14, the control system 50 has electrical connecting means for electrically connecting first and second switches 71, 72 to electric clutch 24. FIG. 13 is a simplified schematic showing the control system 50 when the riding lawn mower 10 is not in reverse. A power source 30 is required and can be of any type chosen with sound engineering judgement but is an alternator as is well known in the art in this preferred embodiment. A relay 36 is also used in this preferred embodiment. The relay 36 can be of any type currently known in the art and chosen with sound engineering judgement but is a single pole double throw (also known as "SPDT") 12 volt, 40 ampere relay in this embodiment. The relay 36 can be positioned in any location chosen with sound engineering judgement but is on the support tower 52 (as shown in FIG. 7) in this embodiment. First and second switches 71, 72, which in this embodiment are electrically in series, are shown in a first position which in this embodiment is an open position. Since first and second switches 71, 72 are open, electricity does not flow from the power source 30 through wiring 35, through relay 36, through wiring 37, through first and second switches 71, 72, and to ground 39. Thus, relay 36 is not energized and electricity continues to flow from the power source 30 through wiring 38, through electric clutch 24, through the switching portion 40 of relay 36, through wiring 41 and to ground 39. In this state, with electricity flowing through it, the electric clutch 24 is maintained in coupling relationship with the cutting blade 20 (shown in FIGS. 2–3) enabling the cutting blade 20 to continue cutting.

FIG. 14 is a simplified schematic showing the control system 50 when the riding lawn mower 10 is in full reverse. As mentioned above, full reverse occurs only when both first and second control handles 15, 17 are placed into reverse position. Full reverse also causes, as will be explained further below, switches 71, 72 to switch to a second position which in this embodiment is a closed position. When first and second switches 71, 72 are closed, electricity flows from the power source 30 through wiring 35, through relay 36, through wiring 37, through first and second switches 71, 72, and to ground 39. Thus, relay 36 is energized switching the switching portion 40 of relay 36, which prevents electricity from flowing from the power source 30 through wiring 38, through electric clutch 24 through wiring 41 and to ground 39. With electric power disconnected from it, the electric clutch 24 is deactivated and ceases to be in coupling relationship with the cutting blade 20 (shown in FIGS. 2–3). Thus the cutting blade 20 (shown in FIGS. 2–3) is prevented from cutting.

Figure 4:
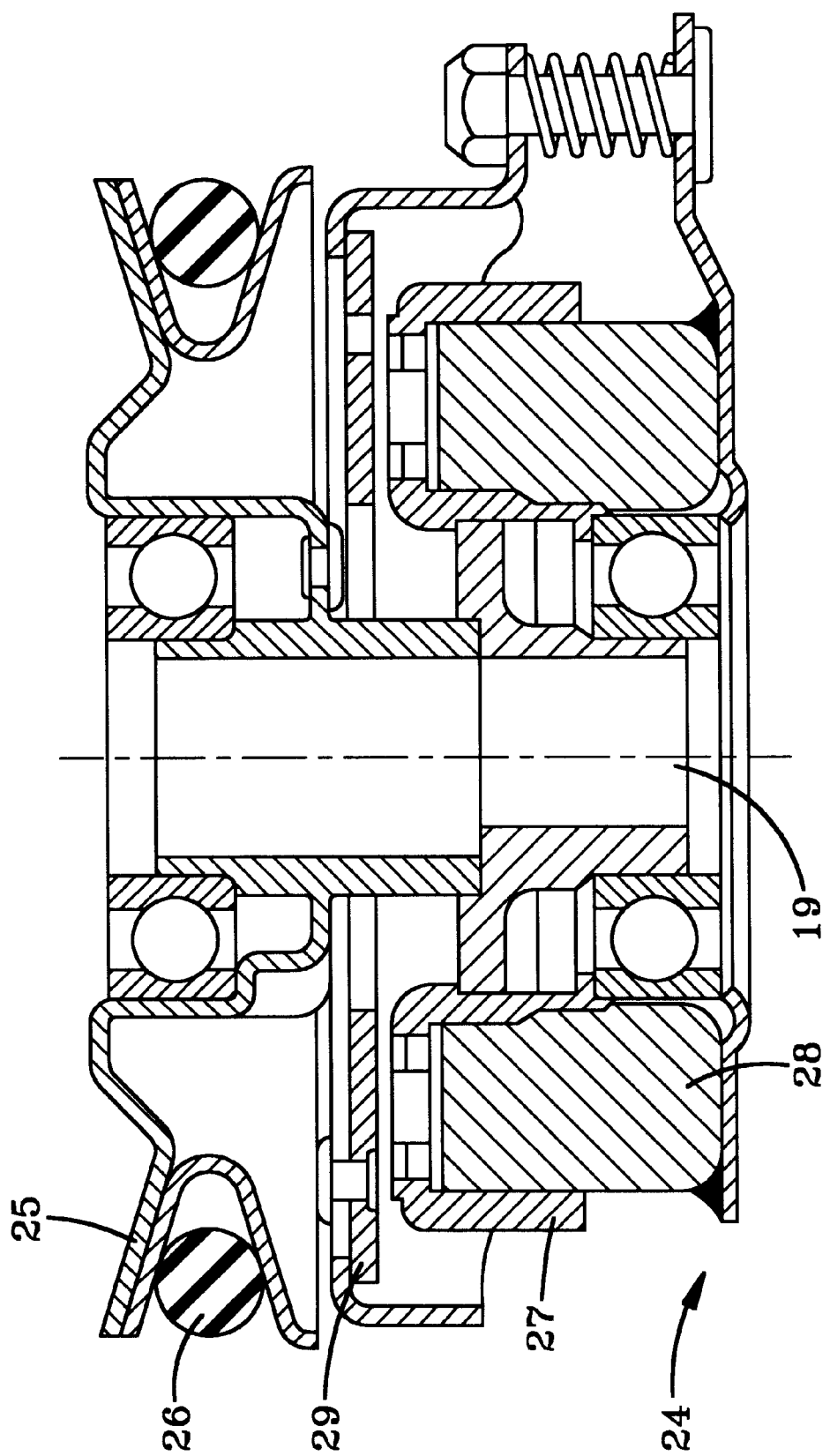
FIG. 4 is a sectional view of an electric clutch coupled to a pulley.
Figure 5:
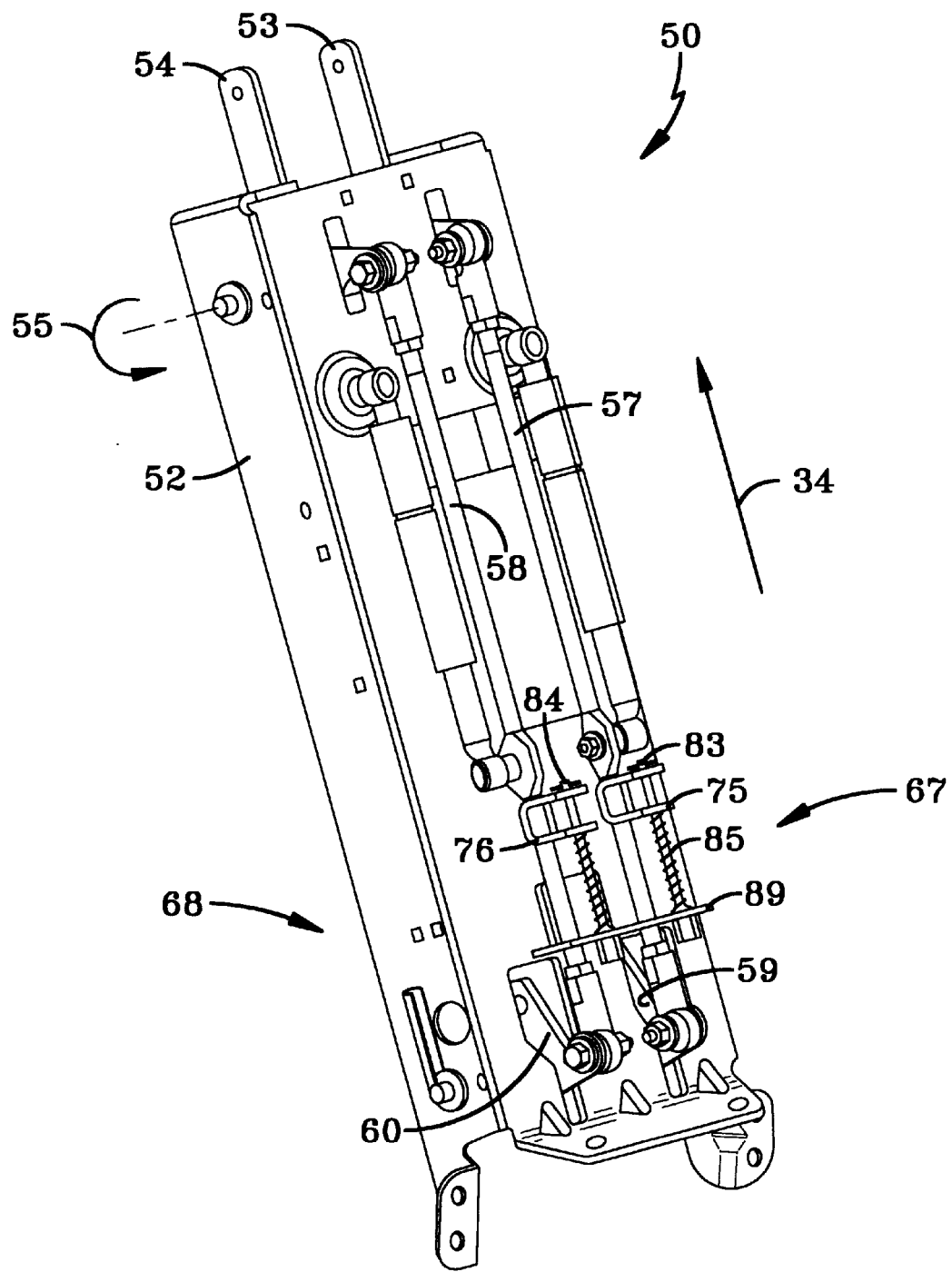
FIG. 5 is a perspective front view of the control system showing the first and second switching mechanisms.
Figure 6:
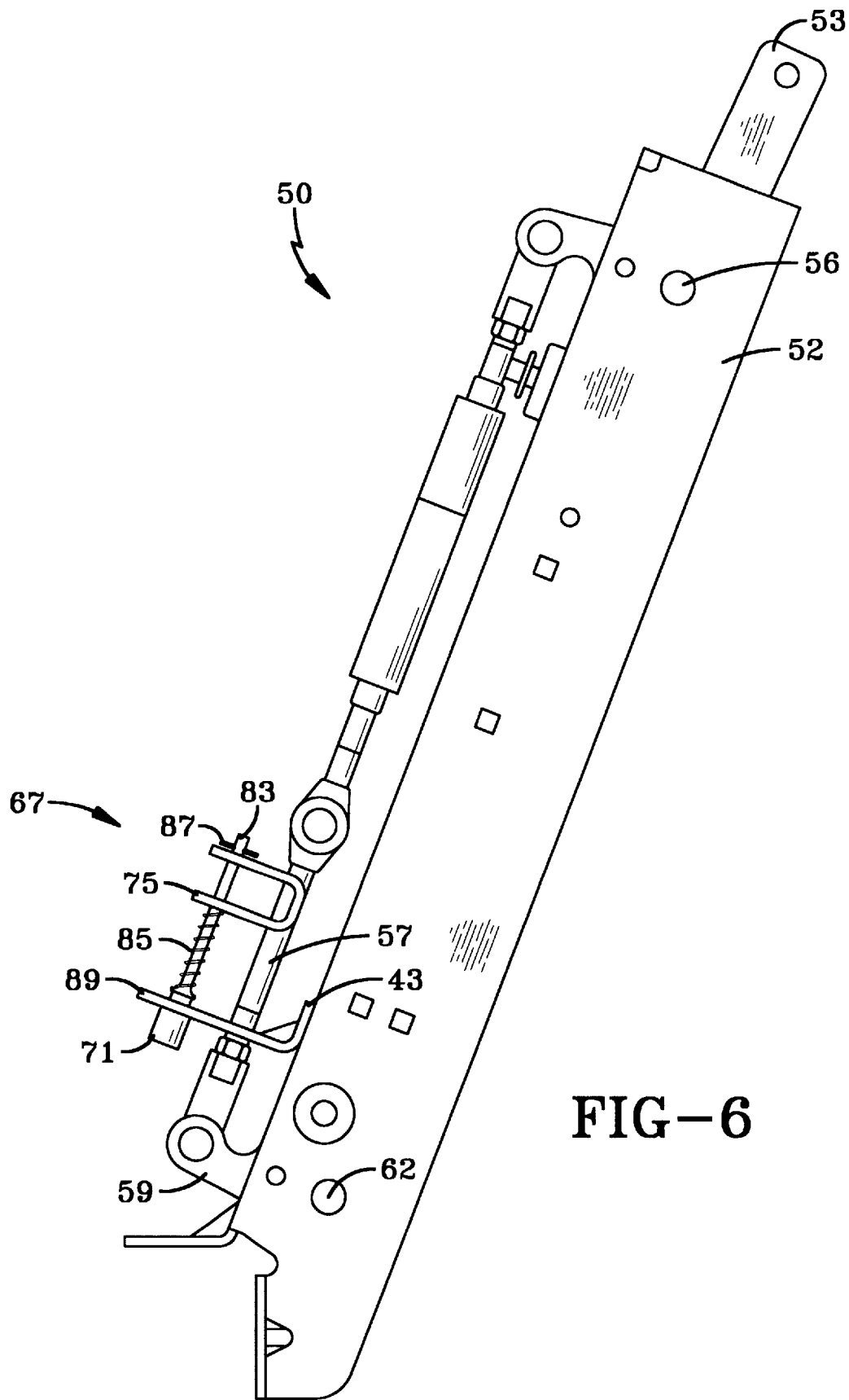
FIG. 6 is a side view of the control system showing the first switching mechanism and the first switch.
Figure 17:
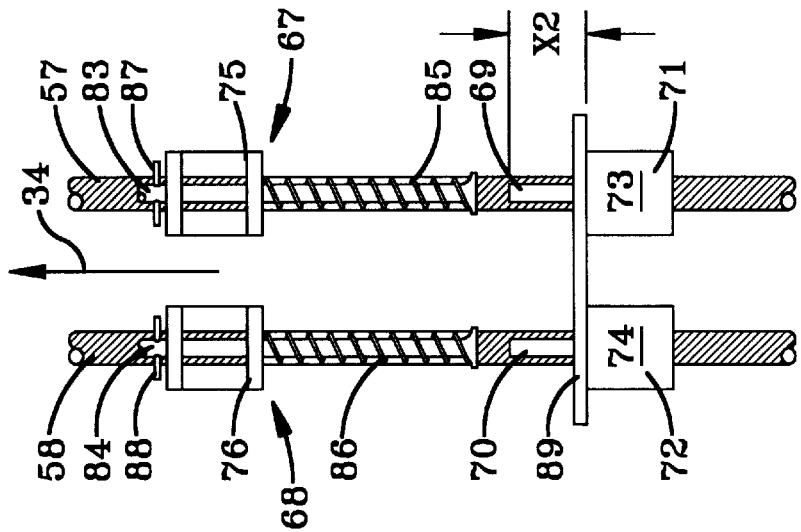
FIG. 17 is a front view of the control system showing the first and second switching mechanisms after first and second control rods have been lifted a farther distance in an upward direction so that first and second pins are also lifted and are no longer in contact with the plungers causing the switches to switch.
Figure 16:
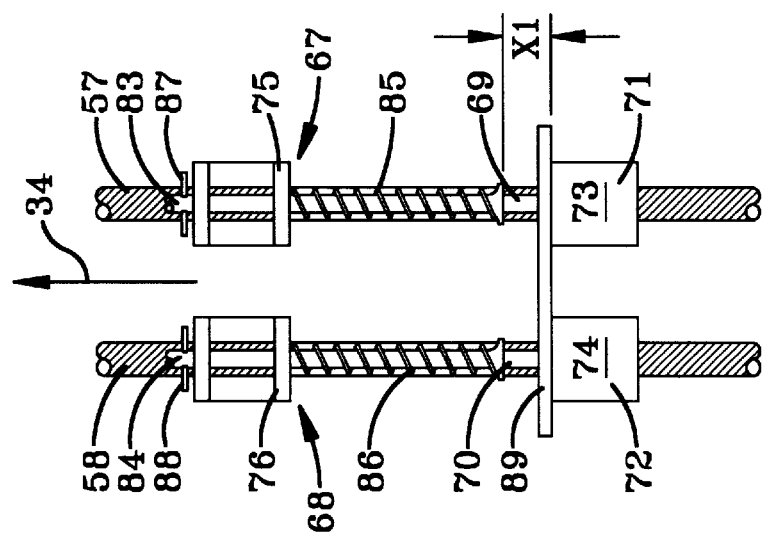
FIG. 16 is a front view of the control system showing the first and second switching mechanisms after first and second control rods have been lifted a relatively short distance in an upward direction.
Figure 15:
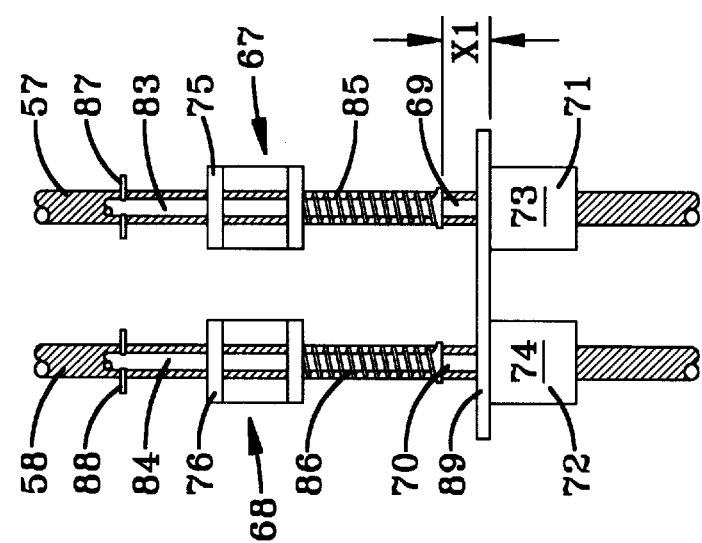
FIG. 15 is a front view of the control system showing the first and second switching mechanisms prior to the lifting of first and second control rods.

With reference to FIGS. 1–17, to place the riding lawn mower 10 in full reverse and thus prevent the cutting blades 20 from cutting, both first and second control handles 15, 17 are placed into reverse positions by pulling them in a reverse direction 45. First and second upper bell cranks 53, 54 then rotate in a counter-clockwise direction 55 lifting first arid second upper control rods 57, 58 in an upward direction 34, rotating first and second lower bell cranks 59, 60 in a counter-clockwise direction 55, pushing first and second lower control rods 63, 64 in a reverse direction 45, operating hydrostatic power units (not shown) to drive first and second drive wheels 16, 18 in a reverse direction 45. As first and second upper control rods 57, 58 are lifted in an upward direction 34, first and second rod brackets 75, 76 are likewise lifted. This lifting does not, however, lift first and second pins 83, 84 initially because they are held against first and second switches 71, 72 by first and second springs 85, 86. FIG. 15 shows the first and second switching mechanisms 67, 68 prior to the lifting of first and second control rods 57, 58. The springs 85, 86 which in this embodiment are compression springs are compressed as first and second pins 83, 84 are held against the plungers 69, 70 of first and second switches 71, 72. FIG. 16 shows the first and second switching mechanisms 67, 68 after first and second control rods 57, 58 have been lifted a relatively short distance in an upward direction 34. As is shown in FIG. 16, first and second springs 85, 86 are now relaxed but first and second pins 83, 84 still hold switches 71, 72 in a first position which in this embodiment is open. FIG. 17 shows the first and second switching mechanisms 67, 68 after first and second control rods 57, 58 have been lifted a farther distance in upward direction 34 than shown in FIG. 16. Now, first and second pins 83, 84 are lifted along with first and second control rods 57, 58 and are no longer in contact with plungers 69, 70. This permits plungers 69, 70 to extend farther out of switch bodies 73, 74 which causes switches 71, 72 to switch into a second position which in this embodiment is closed. When switches 71, 72 close as best seen in FIG. 14, relay 36 is energized and electricity is prevented from reaching electric clutch 24. When the electric clutch 24 loses electricity, as best seen in FIG. 4, rotor 27 is de-energized by coil 28 so that rotor 27 no longer is magnetically attracted to armature 29. This uncouples the electric clutch 24 from the pulley 25 and thus uncouples the engine 14 from the cutting blade 20 preventing cutting.

With reference now to FIGS. 1, 13–14 it should be appreciated that the cutting blade 20 is only prevented from cutting when both switches 71, 72 are switched to the second position. If either switch 71 or 72 was switched to the second position (closed in this embodiment) while the other switch 72 or 71 was in the first position (open in this embodiment) the electric connection between wiring 37 and ground 39 would remain open. This would prevent relay 36 from energizing which would prevent the switching portion 40 of relay 36 from switching which would, in turn, maintain electricity to electric clutch 24 thus permitting the continued cutting of cutting blade 20. Thus the control system 50 of this invention permits cutting when only one drive wheel is in reverse.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A control system for use with an associated mower, the mower having a cutting blade, rotating means for rotating the cutting blade, first and second drive wheels, and driving means for driving the first and second drive wheels, the control system comprising:

coupling means for selectively coupling the cutting blade to the rotating means;

first and second driving control means for independently driving the first and second drive wheels respectively, said first and second driving control means each being selectively placeable into reverse positions, said reverse position of said first driving control means for use in driving the first drive wheel in a reverse direction, said reverse position of said second driving control means for use in driving the second drive wheel in a reverse direction; and, first and second switches selectively switchable between first and second positions, said reverse position of said first driving control means switching said first switch into said second position, said reverse position of said second driving control means switching said second switch into said second position, said first and second switches selectively deactivating said coupling means only when said first and second switches are both in said second position.

2. The control system of claim 1 further comprising:

electrical connecting means for electrically connecting said first and second switches to said coupling means; and mechanical connecting means for mechanically connecting said first and second driving control means to said first and second switches respectively.

3. The control system of claim 2 wherein said first and second switches are electrically aligned in series, said electrical connecting means comprising:

a relay for use in deactivating said coupling means, said relay disconnecting power to said coupling means only when said first and second switches are both in said second position.

4. The control system of claim 3 wherein said coupling means is an electric clutch.

5. A control system for use with an associated mower, the mower having a cutting blade, rotating means for rotating the cutting blade, first and second drive wheels, and driving means for driving the first and second drive wheels, the control system comprising:

(a) an electric clutch for selectively coupling the cutting blade from the rotating means;

(b) first and second driving control means for independently driving the first and second drive wheels respectively, said first and second driving control means selectively placeable into reverse positions, said reverse position of said first driving control means for use in driving the first drive wheel in a reverse direction, said reverse position of said second driving control means for use in driving the second drive wheel in a reverse direction;

(c) first and second switches selectively switchable between first and second positions, said reverse position of said first driving control means switching said first switch into said second position, said reverse position of said second driving control means switching said second switch into said second position, said first and second switches selectively deactivating said coupling means only when said first and second switches are both in said second position;

(d) electrical connecting means for electrically connecting said first and second switches to said coupling means;

(e) mechanical connecting means for mechanically connecting said first and second driving control means to said first and second switches respectively, said mechanical connecting means comprising;

(1) a support tower;

(2) a control shaft, said control shaft rotatably connected to said support tower;

(3) first and second bell cranks, said first and second bell cranks operatively connected to said first and second driving control means respectively, said first and second bell cranks rotatable about said control shaft;

(4) first and second control rods, said first and second control rods pivotably connected to said first and second bell cranks respectively, said first and second control rods movable along their axis; and, (5) first and second switching mechanisms, said first and second switching mechanisms operatively connected to said first and second control rods respectively, said first and second switching mechanisms fixedly attached to said support tower; and, (f) a relay for use in deactivating said coupling means, said relay disconnecting power to said coupling means only when said first and second switches are both in said second position.

6. The control system of claim 5 wherein said first and second switching mechanisms comprise:

first and second rod brackets, said first and second rod brackets fixedly attached to said first and second control rods respectively, said first and second rod brackets having first holes;

first and second pins, said first and second pins axially moveable within said first holes of said first and second rod brackets respectively;

first and second springs for biasing said first and second pins toward said first and second switches;

securing means for securing said first and second pins to said first and second rod brackets respectively; and, a switching bracket fixedly attached to said support tower, said switching bracket having first and second openings for holding said first and second switches respectively in operating contact with said first and second pins respectively.

7. A lawn mower comprising:

at least one cutting blade;

rotating means for rotating said at least one cutting blade;

first and second drive wheels;

driving means for driving said first and second drive wheels;

first and second driving control means for independently driving said first and second drive wheels respectively, each of said first and second driving control means being selectively placeable into a reverse position;

coupling means for selectively coupling said at least one cutting blade to said rotating means, said coupling means selectively de-coupling said at least one cutting blade from said rotating means only when said first and second driving control means are both in said reverse position; and, wherein said coupling means comprises, an electric clutch;

first and second switches;

electrical connecting means for electrically connecting said first and second switches to said electric clutch; and mechanical connecting means for mechanically connecting said first and second driving control means to said first and second switches.

8. The lawn mower of claim 7 wherein said first and second switches are electrically aligned in series, said electrical connecting means comprising:

a relay, said relay selectively disconnecting power to said electric clutch.

9. A lawn mower comprising:

(a) a cutting blade;

(b) rotating means for rotating said cutting blades;

(c) first and second drive wheels;

(d) driving means for driving said first and second drive wheels;

(e) first and second driving control means for independently driving said first and second drive wheels respectively, said first and second driving control means selectively placeable into reverse positions;

(f) detaching means for selectively detaching said cutting blade from said rotating means only when said first and second driving control means are both in said reverse position, the detaching means being;

(1) an electric clutch;

(2) first and second switches, the first and second switches being electrically aligned in series;

(3) electrical connecting means for electrically connecting said first and second switches to said electric clutch; and, (4) mechanical connecting means for mechanically connecting said first and second driving control means to said first and second switches, the mechanical connecting means being;

(A) support tower;

(B) a control shaft, said control shaft rotatably connected to said support tower;

(C) first and second bell cranks, said first and second bell cranks operatively connected to said first and second driving control means respectively, said first and second bell cranks rotatable about said control shaft;

(D) first and second control rods, said first and second control rods pivotably connected to said first and second bell cranks respectively, said first and second control rods movable along their axis;

(E) first and second rod brackets, said first and second rod brackets fixedly attached to said first and second control rods respectively, said first and second rod brackets having first holes;

(F) first and second pins, said first and second pins axially moveable within said first holes of said first and second rod brackets respectively;

(G) first and second springs for biasing said first and second pins toward said first and second switches;

(H) securing means for securing said first and second pins to said first and second rod brackets respectively; and, (I) a switching bracket fixedly attached to said support tower, said switching bracket having first and second openings for holding said first and second switches respectively in operating contact with said first and second pins respectively; and, (g) a relay, said relay selectively disconnecting power to said electric clutch.

10. A method for preventing a mower from cutting when the mower is placed in reverse, the mower having a cutting blade, rotating means for rotating the cutting blade, first and second drive wheels, and driving means for driving the first and second drive wheels, the method comprising the steps of:

(a) placing first and second driving control means into reverse positions;

(b) rotating first and second bell cranks about a control shaft;

(c) lifting first and second control rods;

(d) switching first and second switches; and, (e) detaching the cutting blade from the rotating means for rotating the cutting blade.

11. The method of claim 10 after the step of lifting first and second control rods having the step of:

relaxing first and second compression springs; and, lifting first and second pins.

12. A method for preventing a mower from cutting, the method comprising the steps of:

providing a mower having a cutting blade, rotating means for rotating the cutting blade, first and second drive wheels, first and second driving means for driving the first and second drive wheels respectively, and first and second driving control means for selectively controlling said first and second driving means respectively;

placing either the first or the second driving control means but not both into a reverse position;

permitting the rotating means to rotate the cutting blade;

placing both the first and the second driving control means into the reverse positions;

switching first and second switches;

disconnecting electric power to an electric clutch; and, detaching the cutting blade from the rotating means.

13. The method of claim 12 after the step of switching first and second switches having the step of:

energizing a relay.

* * * * *